(12) United States Patent
Chou

(10) Patent No.: US 10,993,488 B1
(45) Date of Patent: May 4, 2021

(54) GLOVE WITH GRIPPING PROJECTIONS

(71) Applicant: Belle Chou, Union City, CA (US)

(72) Inventor: Belle Chou, Union City, CA (US)

( * ) Notice: Subject to any disclaimer, the term of this patent is extended or adjusted under 35 U.S.C. 154(b) by 520 days.

(21) Appl. No.: 15/898,646

(22) Filed: Feb. 18, 2018

(51) Int. Cl.
*A41D 19/00* (2006.01)
*B32B 5/02* (2006.01)
*B32B 27/12* (2006.01)

(52) U.S. Cl.
CPC ..... *A41D 19/0082* (2013.01); *A41D 19/0003* (2013.01); *A41D 19/0058* (2013.01); *A41D 19/0065* (2013.01); *B32B 5/02* (2013.01); *B32B 27/12* (2013.01); *A41D 2400/80* (2013.01); *B32B 2250/02* (2013.01); *B32B 2262/062* (2013.01); *B32B 2437/02* (2013.01)

(58) Field of Classification Search
CPC ........... A41D 19/0082; A41D 19/0003; A41D 19/0058; A41D 2400/80; A47L 13/18; B32B 2433/00
See application file for complete search history.

(56) References Cited

U.S. PATENT DOCUMENTS

| | | | |
|---|---|---|---|
| 1,979,130 A * | 10/1934 | Wiley | A41D 19/0055 2/168 |
| 3,404,409 A * | 10/1968 | Tillotson | A41D 19/01547 2/161.8 |
| 6,943,130 B2 * | 9/2005 | Gabbrielli | B29C 43/021 264/257 |
| 7,356,852 B2 | 4/2008 | Thai | |
| 8,495,764 B2 | 7/2013 | Hull | |
| D841,934 S * | 3/2019 | Jaeger | D2/617 |
| 2004/0025226 A1 * | 2/2004 | Jaeger | A41D 19/01558 2/161.6 |
| 2009/0139007 A1 * | 6/2009 | Bevier | A63B 71/148 2/161.1 |
| 2010/0071114 A1 * | 3/2010 | Jaeger | A41D 19/01523 2/161.6 |
| 2010/0257656 A1 | 10/2010 | Hull | |
| 2013/0305430 A1 * | 11/2013 | Tomono | A41D 19/01505 2/163 |

* cited by examiner

*Primary Examiner* — Alissa J Tompkins
*Assistant Examiner* — Brieanna Szafran
(74) *Attorney, Agent, or Firm* — Quickpatents, LLC; Kevin Prince

(57) ABSTRACT

A glove for a person's hand includes an elastomeric base layer that has an inside surface, an outside surface, and includes a palm portion adapted to cover a palm and a back of the person's hand. A thumb portion extends outwardly from the palm portion, and four finger portions extend away from the palm portion adjacent the thumb portion. The outside surface of the glove includes a plurality of raised projections cover 20-85% of the palm portion, thumb portion and finger portions. A base of each projection is a polyhedron with two parallel linear sides and two parallel curved sides. Each projection has an apex proximate a first curved side of the curved sides of the polyhedron. The polyhedrons of the projections are arranged to form a plurality of wavy lines.

14 Claims, 5 Drawing Sheets

GLOVE WITH GRIPPING PROJECTIONS

CROSS-REFERENCE TO RELATED APPLICATIONS

Not applicable.

STATEMENT REGARDING FEDERALLY SPONSORED RESEARCH AND DEVELOPMENT

Not Applicable.

FIELD OF THE INVENTION

This invention relates to gloves, and more particularly to an ambidextrous glove adapted to provide superior gripping properties in wet and oily environments.

DISCUSSION OF RELATED ART

This invention relates to clothing, and more particularly to an ambidextrous glove adapted to provide superior gripping properties in dry, wet, and oily environments and decrease fatigue during long term use, by means of a unique textured grip pattern embossed on the glove's contact surfaces featuring a smaller unit cell shape in higher density than other contemporary patterns, designed to remove excess liquid from contact points via applied force by providing: better conformity to the shape of an object; more and smaller contact points with increased rigidity per unit of surface area; and thus higher effective surface contact and higher friction force at the glove-object interface. The prior art includes: U.S. Patent Application No. 20100257656A1 (Oct. 14, 2010); and U.S. Pat. No. 8,495,764B2 (Jul. 30, 2013). It has been found that gloves with relatively large projection or unit cell sizes lose their shape under stress, and that larger unit cell sizes as well as loosely packed projections cause a reduction in the number of contact points, reducing the ability of the glove to grip an object. It is desirable to have an improved glove that is superior to any that is disclosed or suggested in the identified references.

U.S. Pat. No. 7,356,852 to Thai on Apr. 15, 2008 teaches an ambidextrous, latex glove that has a variety of surface textures primarily comprising shaped depressions. With such a glove, particularly in wet applications, liquid tends to pool between an object being grasped and the glove by filling the shaped depressions.

Therefore, there is a need for a glove that has an improved pattern of projections that allows a flow path for liquid to escape from between the glove and an object being grasped. Such a needed invention would accommodate ambidextrous use.

SUMMARY OF THE INVENTION

The present device is a glove for a person's hand, for use to provide superior gripping properties in dry, wet, and oily environments and decrease fatigue. An elastomeric base layer has an inside surface and an outside surface. The elastomeric base layer includes a palm portion adapted to cover a palm and a back of the person's hand. The base layer may be made of polyisoprene (natural rubber); polybutadiene; polyisobutylene; polyurethanes; or any other mechanically similar material. In some preferred embodiments, the glove further includes at least one inner layer abutting the inside surface of the base layer. The inner layer may be made of cotton; linen; various other moisture wicking materials; or any other material suitable for permanent bonding to the base layer which is also suitable for safe, comfortable long-term contact with human skin during prolonged, potentially strenuous physical activity.

A thumb portion extends outwardly from the palm portion, and four finger portions extend away from the palm portion adjacent the thumb portion. The base layer is open at a proximal side to exposing the inside surface thereof and through which the hand is inserted. The palm portion, each finger portion, and the thumb portion each include a front portion and a back portion.

Preferably a base of each projection is a polyhedron with two parallel linear sides and two parallel curved sides. Each projection in such an embodiment has an apex proximate a first curved side of the curved sides of the polyhedron. Each projection preferably includes a gentle linearly sloped surface extending from the apex to each of the linear sides and a second side of the curved sides of the polyhedron, and a steep linearly sloped surface extending from the apex to the first curved side of the curved sides of the polyhedron. Indeed, in some embodiments the steep sloped surface is substantially orthogonal to the outside surface of the glove.

In some embodiments the glove is ambidextrous, the raised projections covering substantially a mirror image of locations on a front and a back of the glove. A projection-free curved path may be included about the thumb portion for facilitating movement of the person's thumb.

The present invention is a glove that has an improved pattern of projections that allows a flow path for liquid to better escape from between the glove and an object being grasped. The present invention further accommodates ambidextrous use. Other features and advantages of the present invention will become apparent from the following more detailed description, taken in conjunction with the accompanying drawings, which illustrate, by way of example, the principles of the invention.

DETAILED DESCRIPTION OF THE PREFERRED EMBODIMENT

Illustrative embodiments of the invention are described below. The following explanation provides specific details for a thorough understanding of and enabling description for these embodiments. One skilled in the art will understand that the invention may be practiced without such details. In other instances, well-known structures and functions have not been shown or described in detail to avoid unnecessarily obscuring the description of the embodiments.

Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively. Additionally, the words "herein," "above," "below" and words of similar import, when used in this application, shall refer to this application as a whole and not to any particular portions of this application. When the claims use the word "or" in reference to a list of two or more items, that word covers all of the following interpretations of the word: any of the items in the list, all of the items in the list and any combination of the items in the list. When the word "each" is used to refer to an element that was previously introduced as being at least one in number, the word "each" does not necessarily imply a plurality of the elements, but can also mean a singular element.

Figure 1:
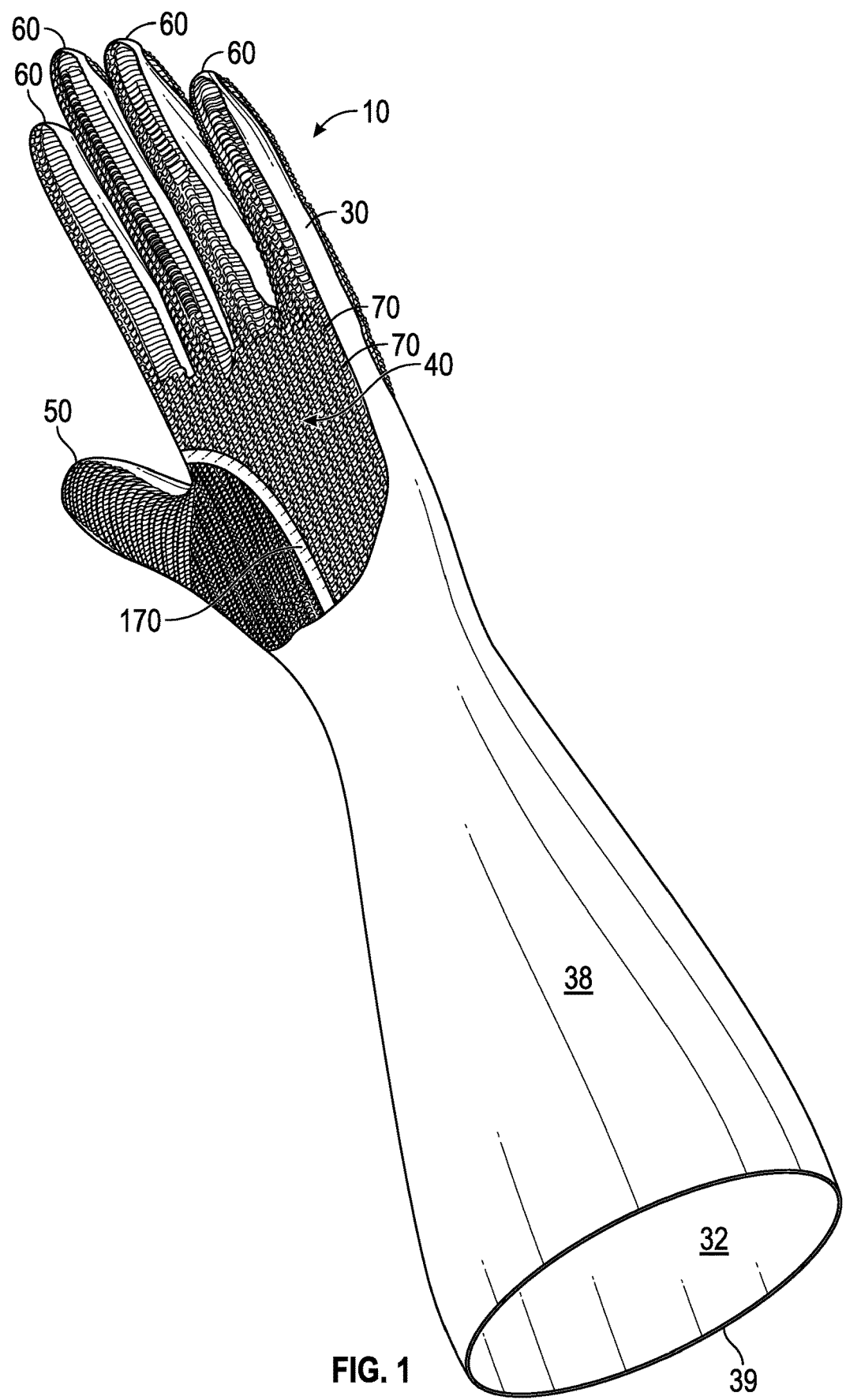
FIG. 1 is a bottom perspective view of a left-handed glove of the invention.
Figure 4:
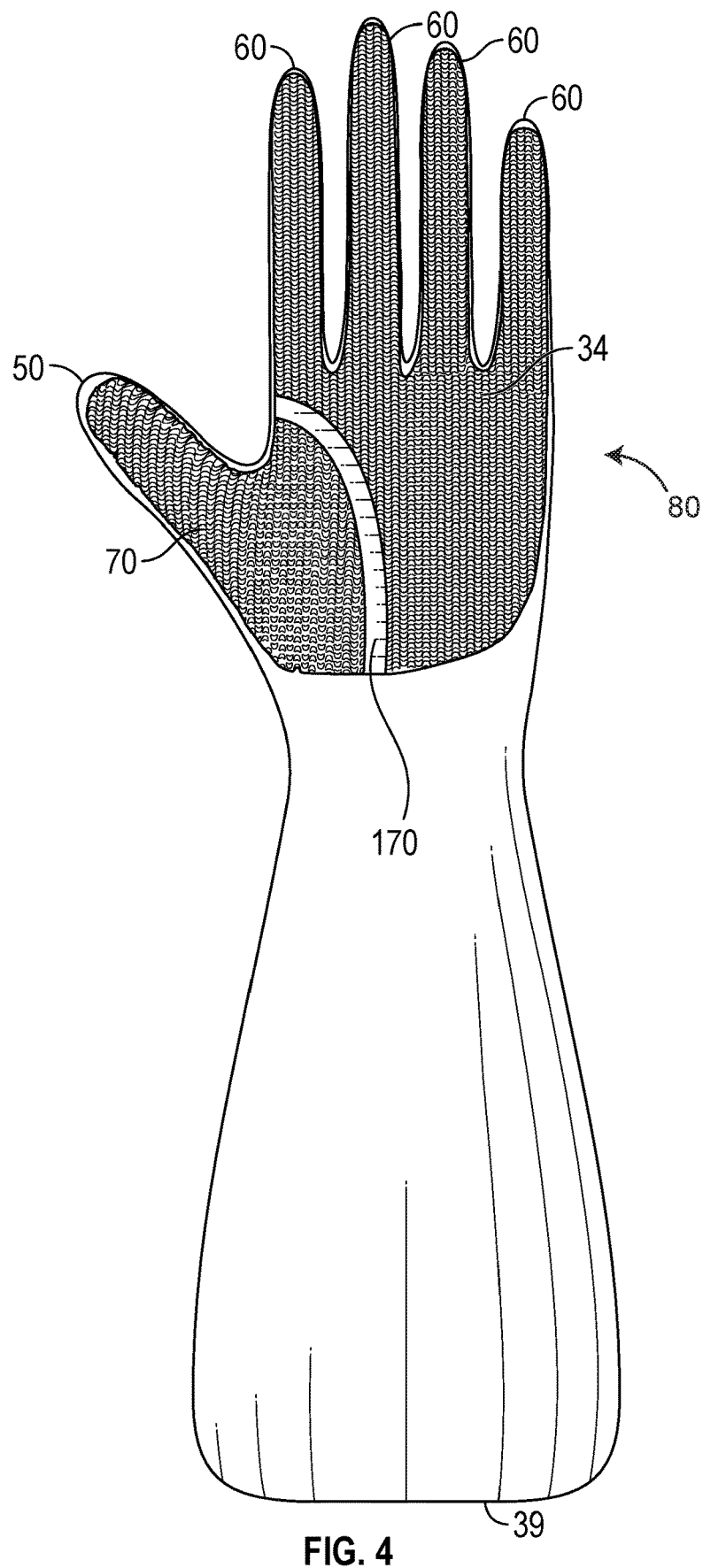
FIG. 4 is a bottom plan view of the invention.
Figure 5:
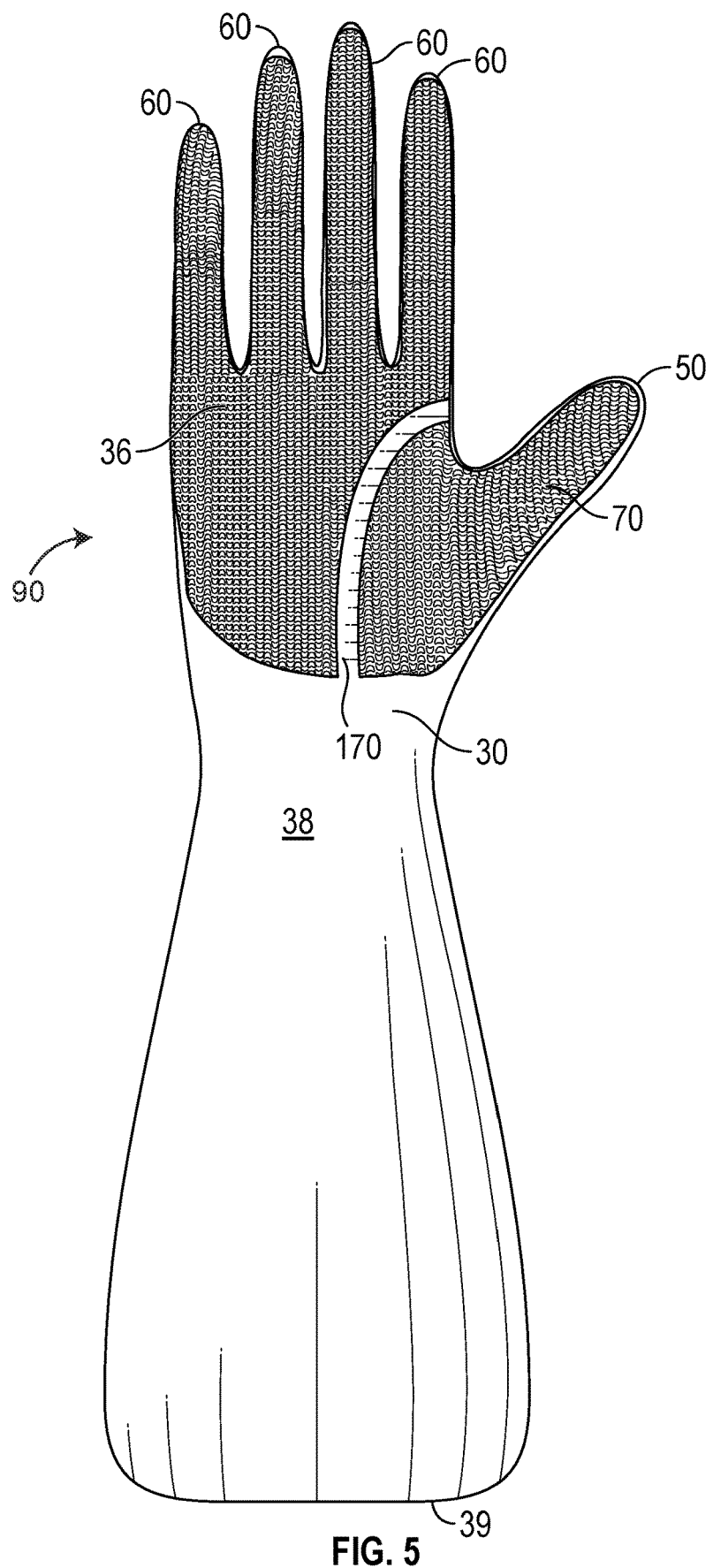
FIG. 5 is a bottom plan view of a right-handed glove of the invention.

FIGS. 1, 4 and 5 illustrate a glove 10 for a person's hand (not shown), for use to provide superior gripping properties in dry, wet, and oily environments and decrease fatigue. An elastomeric base layer 30 has an inside surface 32 and an outside surface 38. The elastomeric base layer 30 includes a palm portion 40 adapted to cover a palm and a back of the person's hand. The base layer 30 may be made of polyisoprene (natural rubber); polybutadiene; polyisobutylene; polyurethanes; or any other mechanically similar material. In some preferred embodiments, the glove 10 further includes at least one inner layer (not shown) abutting the inside surface 32 of the base layer 30. The inner layer may be made of cotton; linen; various other moisture wicking materials; or any other material suitable for permanent bonding to the base layer 30 which is also suitable for safe, comfortable long-term contact with human skin during prolonged, potentially strenuous physical activity.

A thumb portion 50 extends outwardly from the palm portion 40, and four finger portions 60 extend away from the palm portion 40 adjacent the thumb portion 50. The base layer 30 is open at a proximal side 39 to exposing the inside surface 32 thereof and through which the hand is inserted. The palm portion 40, each finger portion 60, and the thumb portion 50 each include a front portion 80 and a back portion 90.

Figure 6:
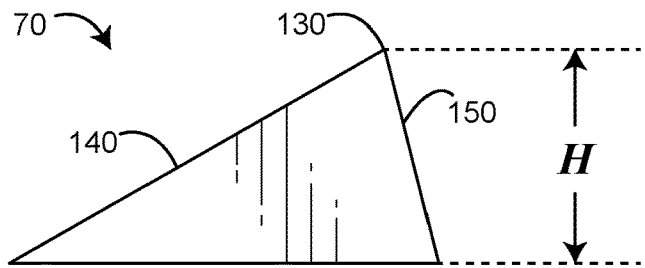
FIG. 6 is a side elevational view of one embodiment of the projection.
Figure 7:
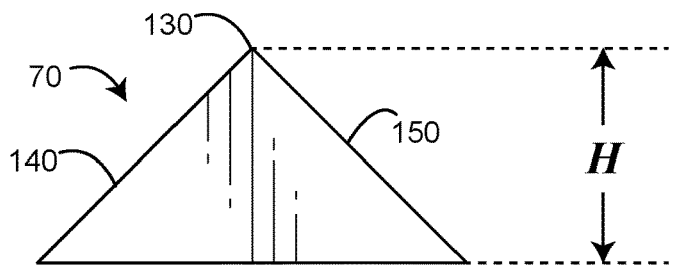
FIG. 7 is a side elevational view of another embodiment of the projection.
Figure 8:
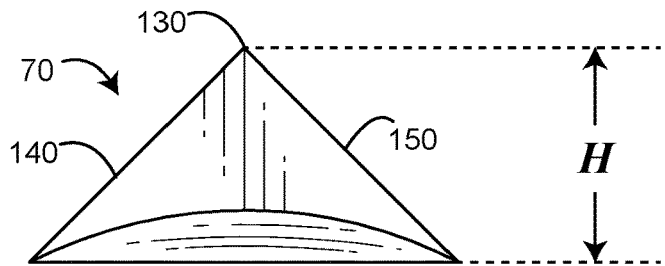
FIG. 8 is a side elevational view of yet another embodiment of the projection.
Figure 9:
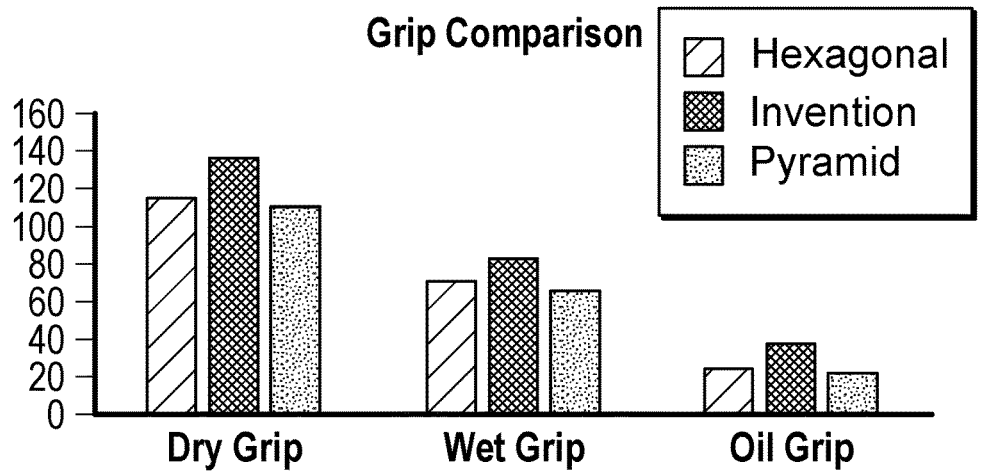
FIG. 9 is a chart showing relative grip strength between gloves having the projections of the instant invention and some prior art projections.

The outside surface 38 of the glove 10 includes a plurality of raised projections 70 cover 20-85% of the palm portion 40, thumb portion 50 and finger portions 60. Preferably a height H (FIGS. 6-8) of each projection is between 0.15 mm and 0.25 mm, with substantially 0.2 mm being highly preferred. The length L of each side 110,120 of the polyhedron 105 is preferably between 1.2 mm and 2.5 mm, with 1.8 mm being especially preferred. The density of projections on the outside surface 38 of the glove 10 is preferably between 20 and 80 per square centimeter, with between 40 and 50 per square centimeter being highly preferred for optimizing the ability of the person 20 to grip web objects with the glove 10 (FIG. 9) with respect to projections having hexagonal or pyramid-shaped projections.

Figure 2:
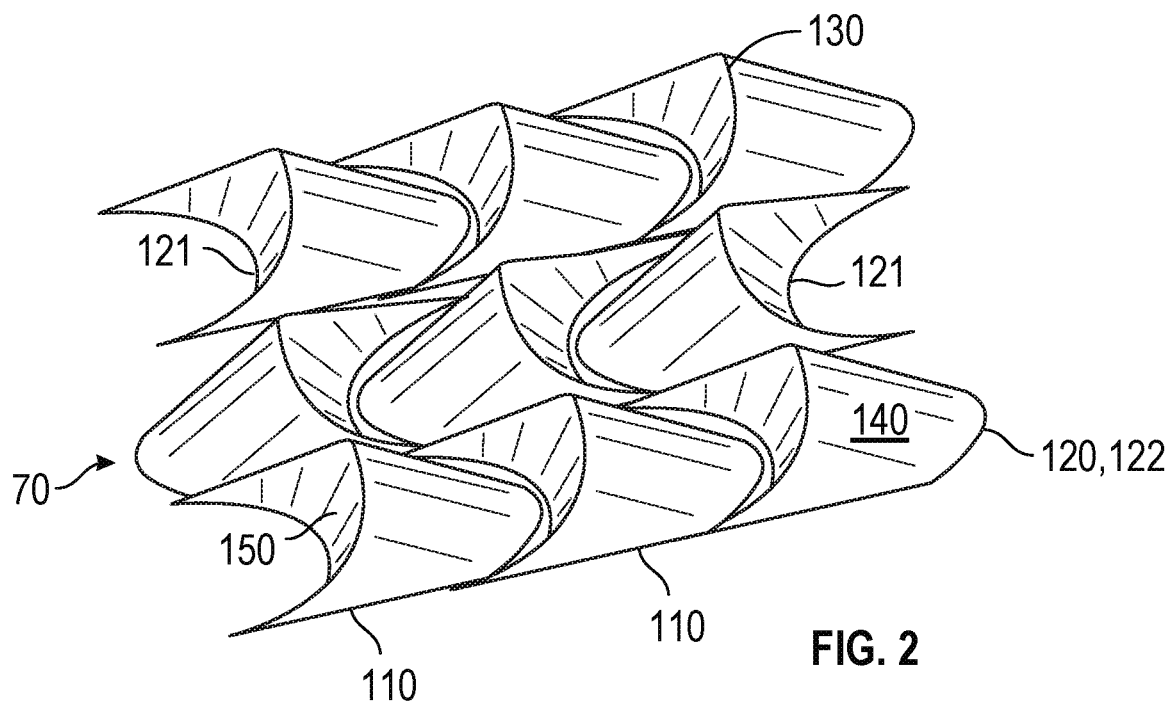
FIG. 2 is an enlarged, partial view of a plurality of raised projections on an outside surface of the invention.
Figure 3:
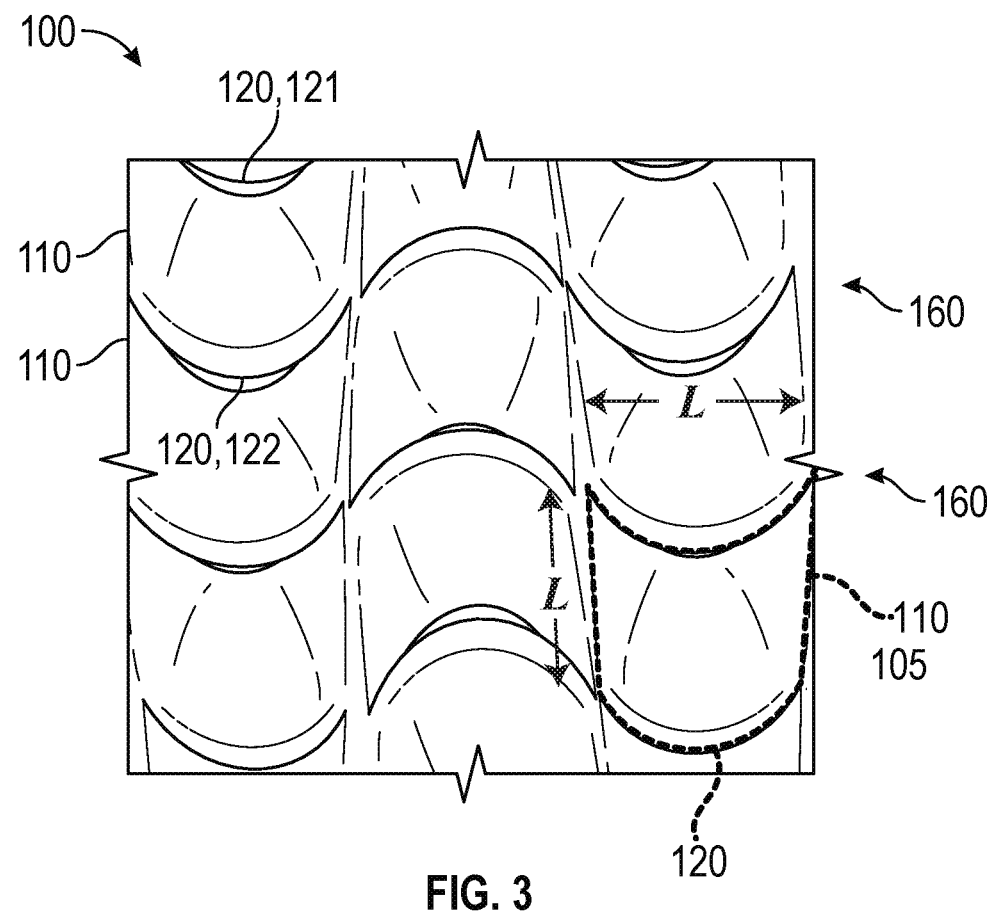
FIG. 3 is an enlarged plan view thereof.

Preferably a base 100 of each projection 70 is a polyhedron with two parallel linear sides 110 and two parallel curved sides 120. Each projection 70 in such an embodiment has an apex 130 proximate a first curved side 121 of the curved sides 120 of the polyhedron 105 (FIGS. 2 and 3). Each projection 70 preferably includes a gentle linearly sloped surface 140 extending from the apex 130 to each of the linear sides 110 and a second side 122 of the curved sides 120 of the polyhedron 105, and a steep linearly sloped surface 150 extending from the apex 130 to the first curved side 121 of the curved sides 120 of the polyhedron 105. Indeed, in some embodiments the steep sloped surface 150 is substantially orthogonal to the outside surface 38 of the glove 10. In preferred embodiments the polyhedron 105 of the projections 70 are arranged to form a plurality of wavy lines 160 (FIG. 3); and further wherein the plurality of projections comprises rows. The orientation of each row of the projections alternates with its adjacent rows of projections as shown.

In some embodiments the glove 10 is ambidextrous, the raised projections 70 covering substantially a mirror image of locations on a front 34 and a back 36 of the glove 10 (FIGS. 4 and 5). A projection-free curved path 170 may be included about the thumb portion 50 for facilitating movement of the person's thumb.

While a particular form of the invention has been illustrated and described, it will be apparent that various modifications can be made without departing from the spirit and scope of the invention. For example, the glove 10 may be made from polymeric materials; latex; leather; fabric; nitrile butadiene rubber (NBR); polyurethane; polyvinyl chloride (PVC); polyvinyl alcohol (PVA); polychloroprene (also known as neoprene); polyisoprene; or any other material suitable to protect a user's hands. Accordingly, it is not intended that the invention be limited, except as by the appended claims.

Particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific embodiments disclosed in the specification, unless the above Detailed Description section explicitly defines such terms. Accordingly, the actual scope of the invention encompasses not only the disclosed embodiments, but also all equivalent ways of practicing or implementing the invention.

The above detailed description of the embodiments of the invention is not intended to be exhaustive or to limit the invention to the precise form disclosed above or to the particular field of usage mentioned in this disclosure. While specific embodiments of, and examples for, the invention are described above for illustrative purposes, various equivalent modifications are possible within the scope of the invention, as those skilled in the relevant art will recognize. Also, the teachings of the invention provided herein can be applied to other systems, not necessarily the system described above. The elements and acts of the various embodiments described above can be combined to provide further embodiments.

All of the above patents and applications and other references, including any that may be listed in accompanying filing papers, are incorporated herein by reference. Aspects of the invention can be modified, if necessary, to employ the systems, functions, and concepts of the various references described above to provide yet further embodiments of the invention.

Changes can be made to the invention in light of the above "Detailed Description." While the above description details certain embodiments of the invention and describes the best mode contemplated, no matter how detailed the above appears in text, the invention can be practiced in many ways. Therefore, implementation details may vary considerably while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated.

While certain aspects of the invention are presented below in certain claim forms, the inventor contemplates the various aspects of the invention in any number of claim forms. Accordingly, the inventor reserves the right to add additional claims after filing the application to pursue such additional claim forms for other aspects of the invention.

What is claimed is:

1. A glove for a person's hand comprising:
an elastomeric base layer having an inside surface and an outside surface, the elastomeric base layer including a palm portion adapted to cover a palm and a back of a person's hand, a thumb portion extending outwardly from the palm portion, and four finger portions extending away from the palm portion adjacent the thumb portion, the base layer open at a proximal side to expose the inside surface thereof;
the palm and each finger portion and thumb portion including a front and a back portion;
the outside surface of the glove including a plurality of raised projections covering 20-85% of the palm portion, thumb portion and finger portions;
a base of each projection being a polyhedron with two parallel linear sides and two parallel curved sides, each projection having an apex proximate a first of the curved sides of the polyhedron and a linear sloped surface extending from the apex to each of the linear sides and a second of the curved sides of the polyhedron, the polyhedrons being arranged to form a plurality of wavy lines.

2. The glove of claim 1 wherein each projection includes a steep linear sloped surface extending from the apex to the first of the curved sides of the polyhedron.

3. The glove of claim 2 wherein the steep linearly sloped surface is substantially orthogonal to the outside surface of the glove.

4. The glove of claim 1 wherein the glove is ambidextrous, the raised projections covering substantially a mirror image of locations on a front and a back of the glove.

5. The glove of claim 1 wherein the palm portion includes a projection-free curved path about the thumb portion for facilitating movement of the thumb.

6. The glove of claim 1 wherein a height of each projection is between 0.15 mm and 0.25 mm.

7. The glove of claim 1 wherein the height of each projection is substantially 0.2 mm.

8. The glove of claim 1 wherein a length of each side of the polyhedron is between 1.2 mm and 2.5 mm.

9. The glove of claim 1 wherein a length of each side of the polyhedron is substantially 1.8 mm.

10. The glove of claim 1 wherein a density of projections is between 20 and 80 per square centimeter.

11. The glove of claim 1 wherein a density of projections is between 30 and 40 per square centimeter.

12. The glove of claim 1 wherein the arrangement of the projections creates lateral gutters on either side of the projections, whereby flow of excess liquids off of the projections is facilitated.

13. The glove of claim 1 wherein the plurality of projections comprises rows; wherein the orientation of each row of the projections alternates with its adjacent rows of projections.

14. A glove for a person's hand comprising:
an elastomeric base layer having an inside surface and an outside surface, the elastomeric base layer including a palm portion adapted to cover a palm and a back of a person's hand, a thumb portion extending outwardly from the palm portion, and four finger portions extending away from the palm portion adjacent the thumb portion, the base layer open at a proximal side to expose the inside surface thereof;
the palm and each finger portion and thumb portion including a front and a back portion;
the palm portion includes a projection-free curved path about the thumb portion for facilitating movement of the thumb;
the outside surface of the glove including a plurality of raised projections covering 20-85% of the palm portion, thumb portion and finger portions;
a base of each projection being a polyhedron with two parallel linear sides and two parallel curved sides, each projection having an apex proximate a first of the curved sides of the polyhedron and a linear sloped surface extending from the apex to each of the linear sides and a second of the curved sides of the polyhedron, the polyhedrons being arranged to form a plurality of wavy lines, a length of each side of the polyhedron being between 1.2 mm and 2.5 mm.

* * * * *